(12) United States Patent
Wu et al.

(10) Patent No.: US 8,254,382 B1
(45) Date of Patent: Aug. 28, 2012

(54) LOCATION PREFERENCE INDICATOR IN NETWORK ACCESS IDENTIFIER

(75) Inventors: Yingzhe Wu, San Marcos, CA (US); Nanjian Qian, San Diego, CA (US)

(73) Assignee: ZTE (USA) Inc., Morristown, NJ (US)

( * ) Notice: Subject to any disclaimer, the term of this patent is extended or adjusted under 35 U.S.C. 154(b) by 915 days.

(21) Appl. No.: 12/237,367

(22) Filed: Sep. 24, 2008

Related U.S. Application Data (60) Provisional application No. 60/974,819, filed on Sep. 24, 2007.

(51) Int. Cl.
*H04L 12/56* (2006.01)
*H04J 3/16* (2006.01)
*G06F 17/00* (2006.01)

(52) U.S. Cl. ............. 370/389; 370/465; 726/12; 726/15
(58) Field of Classification Search ................. None
See application file for complete search history.

(56) References Cited

U.S. PATENT DOCUMENTS

2006/0203791 A1* 9/2006 Carrion-Rodrigo et al. .. 370/338
* cited by examiner

*Primary Examiner* — Clemence Han
(74) *Attorney, Agent, or Firm* — Perkins Coie LLP (57) ABSTRACT

Wireless communication systems and methods based on network-based IP mobility that use an anchor point location preference indicator in the Network Access Identifier (NAI) used during network entry process in a wireless network to provide an indication of a preference for a mobile subscriber station to obtain an IP address; and operate the wireless network based on Proxy Mobil IP to support the preference in the point location preference indicator in the NAI.

11 Claims, 7 Drawing Sheets

LOCATION PREFERENCE INDICATOR IN NETWORK ACCESS IDENTIFIER

PRIORITY CLAIM AND RELATED APPLICATION

This application claims benefit of U.S. Provisional Application No. 60/974,819 entitled "Location preference indicator in Network Access Identifier (NAI)" and filed on Sep. 24, 2007, the entire disclosure of which is incorporated by reference as part of the specification of this application.

BACKGROUND

This application relates to wireless communications.

Wireless communication systems provide voice or data services to subscriber stations or mobile stations (e.g., wireless or mobile stations) situated within a geographic region by dividing the region into a number of cells. Each cell may be further divided into two or more sectors. Each cell contains system communication equipment such as a base station that transmits communication signals to fixed or mobile subscriber stations on the downlink and receives communication signals from the subscriber stations on the uplink. A base station can provide connectivity, management, and control of the subscriber station. One example of wireless communication systems with the above cellular design is wireless networks based on WiMAX (Wireless Interoperability for Microwave Access) technology based on IEEE 802.16 standards, e.g., IEEE 802.16d/e.

In a legacy 3G network, the "Simple IP" network solution supports two types of subscribers, stationary wireless user devices and mobile wireless user devices, over a Radio Access Network (RAN). For both types of subscribers, a packet data session begins when the subscribers wirelessly attach to the Radio Access Network (RAN) and invoke packet data services. A packet data session ends when the user or the network terminates packet data service. During the particular packet data session, the user may change a location anchored to the RAN, i.e., the point of attachment (PoA).

In many existing networks, simple IP user can only obtain an IP address locally. Such usage scenarios include Wi-Fi equipped laptop obtains an IP address from local wireless access point, dial-up user obtains an IP address from local Internet Service Provider (ISP), cable modem/DSL user obtains an IP address locally from its ISP. Common protocols used for IP address configuration in these cases are DHCP or PPP. With the introduction of new technology, such as Proxy Mobile IP (MIP) or Simple IP anchoring at home, the user now has the option to choose whether he wants to have an IP address that is assigned by local network as in the traditional case, or an IP address that is assigned by his home network. When the IP address is assigned by user's home network, the user can invoke additional services or capabilities that are not obtainable by local services only. Such services and capabilities include IP Multimedia Subsystem (IMS), Multicast/Broadcast and IP session continuity during global mobility.

SUMMARY

Examples and implementations of wireless communication systems and methods based on network-based IP mobility are described in this document. In one aspect, a communication method includes using an anchor point location preference indicator in the Network Access Identifier (NAI) used during network entry process in a wireless network to provide an indication of a preference for a mobile subscriber station to obtain an IP address. The wireless network based on Proxy Mobil IP is operated to support the preference in the point location preference indicator in the NAI.

In one example, the anchor point location preference indicator may be in the form of NAI decoration. In one implementation, a first value is assigned to the NAI decoration to indicate preference of a local IP address and a second value is assigned to the NAI decoration to indicate preference of an IP address anchored to a home network. In another implementation, a first value is assigned to the NAI decoration to indicate no preference on the source of an IP address; and a second value is assigned to the NAI decoration to indicate preference of an IP address anchored to a home network.

In another aspect, a wireless communication network is provided to include an access service network comprising base stations to provide radio access to wireless subscriber stations; a connectivity service network in communication with the access service network to provide IP connectivity to wireless subscriber stations; a mechanism for providing an anchor point location preference indicator in the Network Access Identifier to represent a preference for a subscriber station to obtain an IP address between a local IP address and an IP address anchored to a home network of the subscriber station; and a mechanism based on Proxy Mobil IP to support the preference in the point location preference indicator in the Network Access Identifier. In one implementation, a first value is assigned to the indicator to indicate preference of a local IP address; and a second value is assigned to the indicator to indicate preference of an IP address anchored to the home network. In another implementation, a first value is assigned to the indicator to indicate no preference on the source of an IP address; and a second value is assigned to the indicator to indicate preference of an IP address anchored to the home network.

These and other aspects and various implementations are described in greater detail in the drawing, the description and the claims.

DETAILED DESCRIPTION

Figure 1:
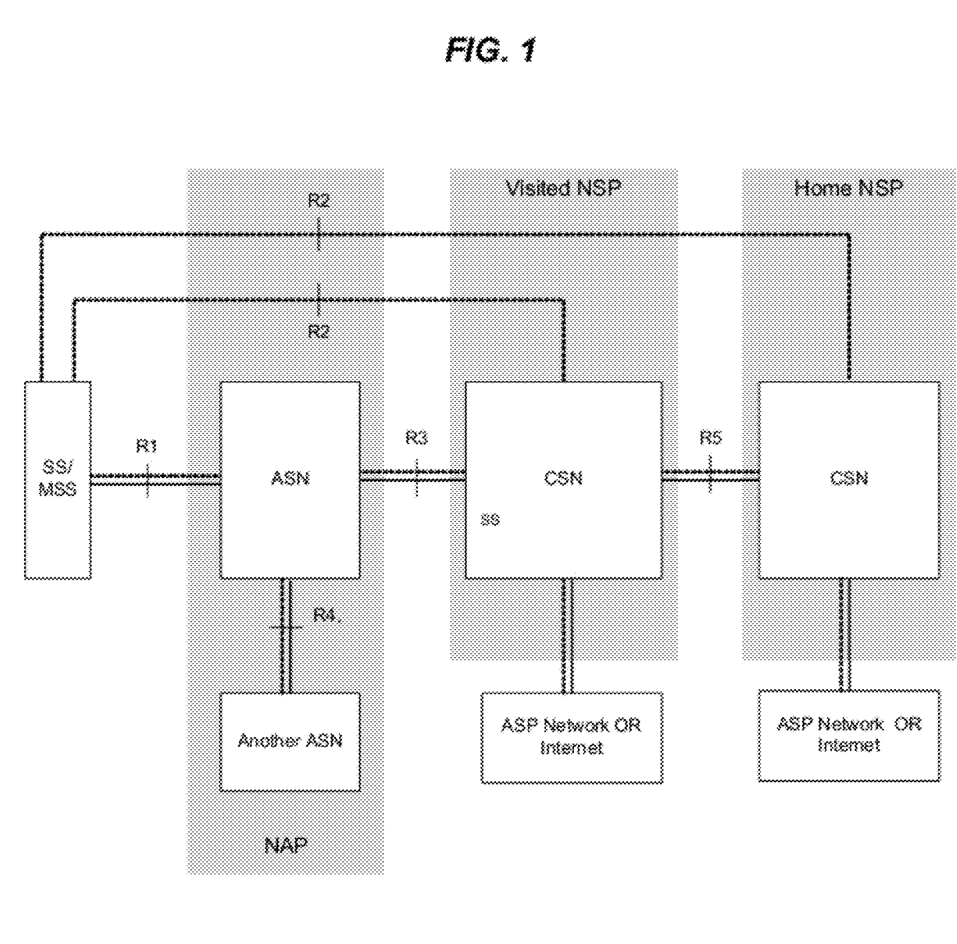
FIG. 1 shows an example of a WiMAX network architecture and its associated network model.

FIG. 1 shows an example of a WiMAX network architecture and its associated network model. This system includes a network of base stations (BSs) or base transceiver stations (BSTs) that are spatially distributed in a service area to form an access radio network (ASN) for wireless subscriber stations (SSs) or Mobile Stations (MSs). ASN includes a set of network functions that provide radio access to one or more mobile stations. A SS or MS may be any communication device capable of wirelessly communicating with base stations and may be implemented as a mobile SS or a fixed SS which may be relocated within the system. Examples of a stationary wireless device may include desktop computers and computer servers. Examples of a mobile wireless device may include mobile wireless phones, Personal Digital Assistants (PDAs), and mobile computers. A base station in the system is a radio transceiver that is conceptually at a center of a cell and wirelessly communicates with a MS in the cell via downlink radio signals. Each BS may be designed to have directional antennas and to produce two or more directional beams to further divide each cell into different sections. Base station controllers (BSCs) are provided in the system to control the BSs. Each BSC is connected to a group of two or more two or more designated BSs and controls the connected BSs. One or more ASN Gateway (GW) units are provided in each ASN to control the BSCs and the corresponding BSs.

The wireless WiMAX network in FIG. 1 can include at least one ASN and may include two or more ASNs. Each ASN is connected to a carrier IP network which carries data. Such ASNs may be owned by a Network Access Provider (NAP). The wireless WiMAX network also includes a Connectivity Serving Network (CSN) that provides a set of network functions for IP connectivity services to mobile stations which has IP connectivity capability. Optionally, the wireless WiMAX network can be structured to support multihop relay (MR) base stations that expand the radio coverage of the radio access network. The ASN can include one or more ASN-MR servers and the CSN can include one or more CSN-MR servers.

The network in FIG. 1 also includes other network entities or modules. A Home Agent (HA) is a router on a mobile node's home network which tunnels datagram for delivery to the mobile node when it is away from home, and maintains current location information for the mobile node. A Foreign Agent (FA) is a router on a visited network which tunnels datagram for delivery to the mobile node when it is away from home, and maintains tunneling information for the mobile node.

FIG. 1 is in essence a logical representation of the WiMAX network architecture based on Network Reference Model (NRM). The NRM identifies functional entities and reference points over which interoperability is achieved between functional entities. FIG. 1 depicts normative reference points R1-R5.

Each of the entities, MS, ASN and CSN represent a grouping of functional entities. Each of these functions may be realized in a single physical functional entity or may be distributed over multiple physical functional entities. The grouping and distribution of functions into physical devices within the ASN is an implementation choice. The NRM allows multiple implementation options for a given functional entity, and yet achieves interoperability among different realizations of functional entities. Interoperability is based on the definition of communication protocols and data plane treatment between functional entities to achieve an overall end-to-end function, for example, security or mobility management. A reference point (RP) is a conceptual link that connects two groups of functions that reside in different functional entities of an ASN, CSN, or MS and thus RP is not necessarily a physical interface. A reference point becomes a physical interface when the functional entities on either side of the RP are contained in different physical MSs. The functional entities on either side of RP represent a collection of control and Bearer Plane end-points. In this setting, interoperability will be verified based only on protocols exposed across an RP, which would depend on the end-to-end function or capability realized (based on the usage scenarios supported by the overall network).

Reference Point R1 includes the protocols and procedures between MS and ASN as per the air interface (PHY and MAC) specifications (IEEE P802.16e-2005, IEEE P802.16-2004 and IEEE 802.16g). Reference point R1 may include additional protocols related to the management plane. Reference Point R2 includes protocols and procedures between the MS and CSN associated with Authentication, Services Authorization and IP Host Configuration management. The authentication part of reference point R2 runs between the MS and the CSN operated by the home Network Service. Provider (NSP), however the ASN and CSN operated by the visited NSP may partially process the aforementioned procedures and mechanisms. Reference Point R2 might support IP Host Configuration Management running between the MS and the CSN (operated by either the home NSP or the visited NSP). Reference Point R3 includes the set of Control Plane protocols between the ASN and the CSN to support authentication, authorization and accounting (AAA) functions, policy enforcement and mobility management capabilities. It also encompasses the Bearer Plane methods (e.g., tunneling) to transfer user data between the ASN and the CSN. Reference Point R4 includes a set of Control and Bearer Plane protocols originating/terminating in various functional entities of an ASN that coordinate MS mobility between ASNs and ASN-GWs. R4 is the only interoperable RP between similar or heterogeneous ASNs. Reference Point R5 includes the set of Control Plane and Bearer Plane protocols for internetworking between the CSN operated by the home NSP and that operated by a visited NSP.

Simple IP refers to a service that a device must obtain a new IP address (and lose existing connections) every time it changes its point of attachment to the network. That is, moving from the coverage area of one access network to another access network constitutes a change in packet data session when a new IP address is assigned by the network. The terminal retains its IP address as long as the Access Network providing point of attachment for the terminal has connectivity to the serving router. If the terminal across the IP access network boundary, the terminal needs to have a new IP session. Simple IP can be applied to both stationary access as well as simple/full mobility access deployments.

Client Mobile IP refers to the network solution implementation based on the standard RFC 3344 design which leverages the mobile client software installed in the user device to enable the user device to handle the change of point of attachment to the access network region without changing its IP address. This will allow the user device to maintain the IP session when roaming to other access network.

Proxy-Mobile IP differs from Client MIP is that the user device is not aware of the standard Mobile IP support by the network according to the RFC 3344. The access network implements the proxy mobile client as well as the network agent functions (i.e. Home Agent (HA) and/or Foreign Agent (FA)) to handle the change of point of attachment of the user device to the access network region. As such, the user device is aware of that it has been served as a mobile terminal.

In FIG. 1, Reference point R3 is the interface between ASN and CSN to carry control information and IP packets. In Mobile IP environment, the R3 data path establishment equals the MIP session establishment. The R3 connection establishment is shown below:

To realize the MS global roaming without changing its IP address, MIP (mobile IP) protocol is introduced by IETF (Internet Engineering Task Force). The MS with MIP capability can roam into different network without losing its original IP address which is assigned while it registers to the network. But there are still many MSs don't and will not have MIP capability. Those MSs can have the same mobility performance as the MS with MIP capability, To achieve this, the current WiMAX provides a Proxy MIP (PMIP) protocol which a network entity called PMIP client with MIP capability conducts Mobile IP operation on behalf of the MS.

In various existing systems, a Simple IP client can only obtain an IP address locally. Such usage scenarios include Wi-Fi equipped laptop obtains an IP address from local wireless access point, dial-up user obtains an IP address from local Internet Service Provider (ISP), cable modem/DSL user obtains an IP address locally from its ISP. Common protocols used for IP address configuration in these cases are DHCP or PPP. With the introduction of PMIP technology or Simple IP home anchoring in WiMAX, a simple IP user could potentially obtain an IP address from its home network. During access authentication stage of the network entry, if the Home Agent (HA) or Anchoring Router is determined to be located at home, then the IP address obtained by PMIP client or Access Router will come from the home network. When the HA or Anchoring Router is located in visited network, then the IP address obtained by PMIP client or Access Router will come from the visited network.

Sometimes users may not always want an IP address from the home network. For example, in international roaming, if a user obtains an IP address from its home located across continent, the user may suffer from delay, jitter and poor throughput. In client Mobile IP case, the user can indicate his specific preference as to where the HA is located by using the HA field in RRQ set to ALL-ZERO-ONE-ADDR in MIP4 case, or in the MIP6 case, asking for specific HA information through DHCPv6 message exchange. Such capability is not available for Simple IP client. And usually this is not a concern for Simple IP client until now, after PMIP or Simple IP home anchoring is introduced.

The techniques described in this document can be used to provide flexible IP address mechanism in wireless communication networks using network-based mobility. One example of such networks is a WiMAX network. Other examples include wireless access technologies using network based mobility such as PMIP.

In one aspect, an anchor point location preference indicator is introduced in the Network Access Identifier (NAI) used during network entry process. Such indicator only provides an indication for preference, and may not be accommodated by network. If network is capable of PMIP or Simple IP home anchoring, the request from MS may be honored by anchoring the HA or Anchoring Router at its home.

In one implementation, the anchor point location preference indicator can take the form of NAI decoration, as indicated below:

[RoutingRealm1! RoutingRealm2! . . . !]{WiMAX-decoration}username@realm where the {WiMAX-decoration} could take the following values:

None: if the decoration is not included, it means MS has no special preference, the anchor location will be determined by network.

{anchor=0}: it means MS prefers to be anchored at local network.

{anchor=1}: it means MS prefers to be anchored at home network.

This method can be used by not only WiMAX, but other access technologies that use PMIP or Simple IP home anchoring. For example, if 3GPP2 (Third Generation Partnership Project 2) decides to use PMIP, the decorated NAI (Network Access Identifier) with the anchor point location preference indicator can be conveyed during PPP setup stage when MS asking for a simple IP address.

By adopting the above anchor point location preference indicator in NAI, MS may be able to obtain an IP address from where it prefers. It could be local, if MS prefers better throughput, delay characteristics, or it could be home, if MS prefers to stay anchored during inter-technology handoff.

Figure 2:
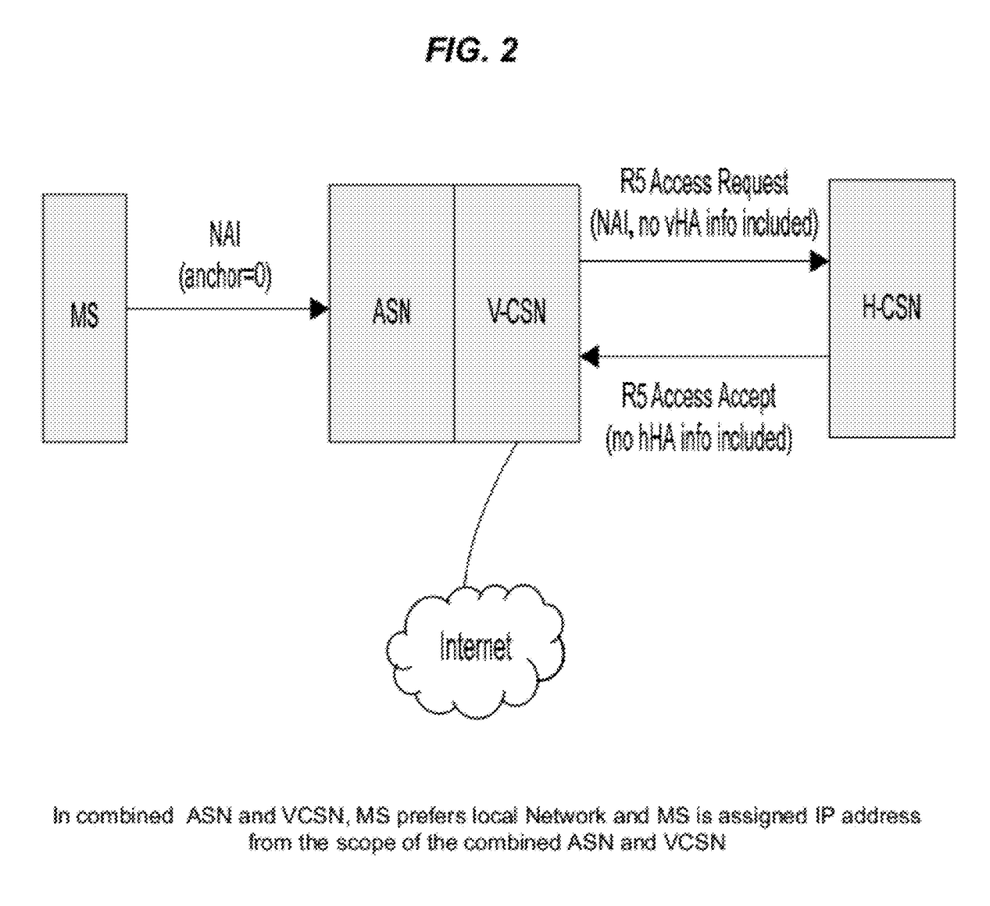
FIGS. 2-5 show examples of assigning an IP address to a mobile station in different network situations.
Figure 3:
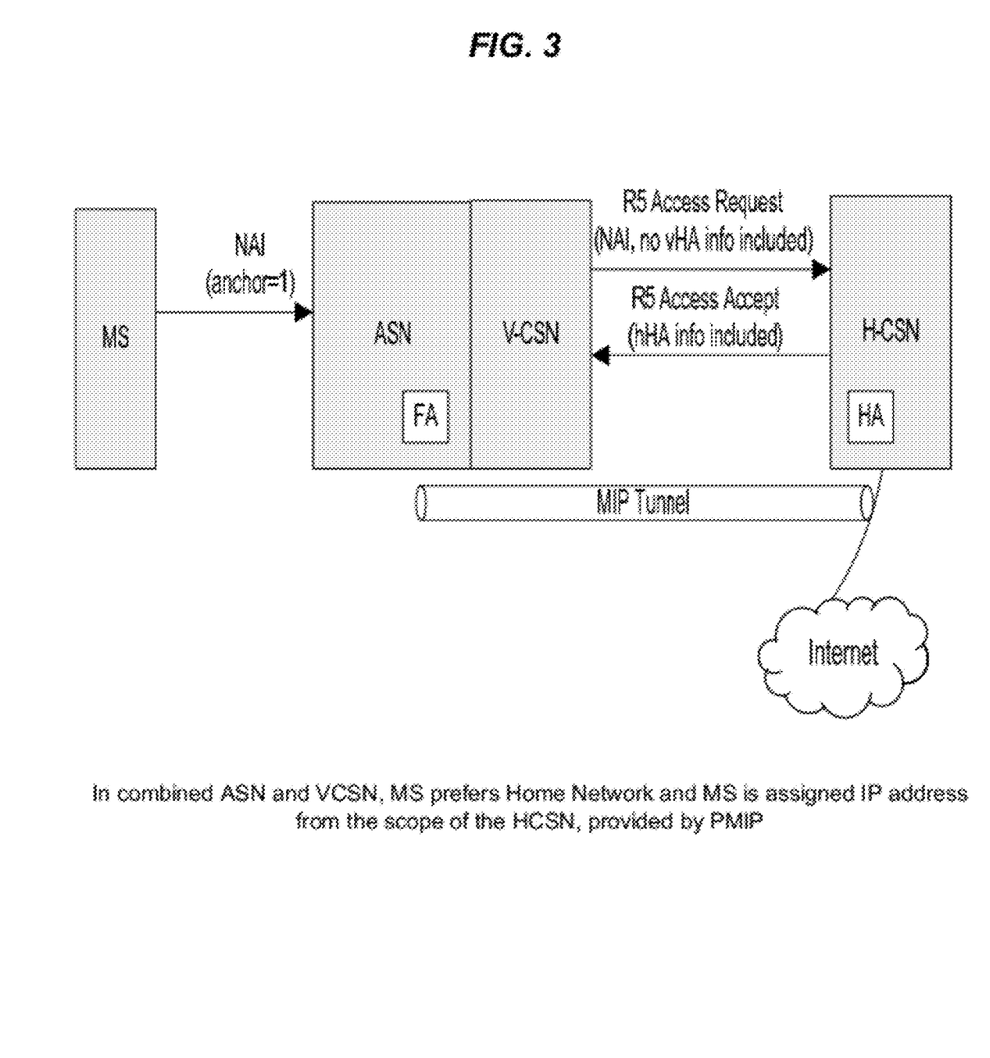
Figure 4:
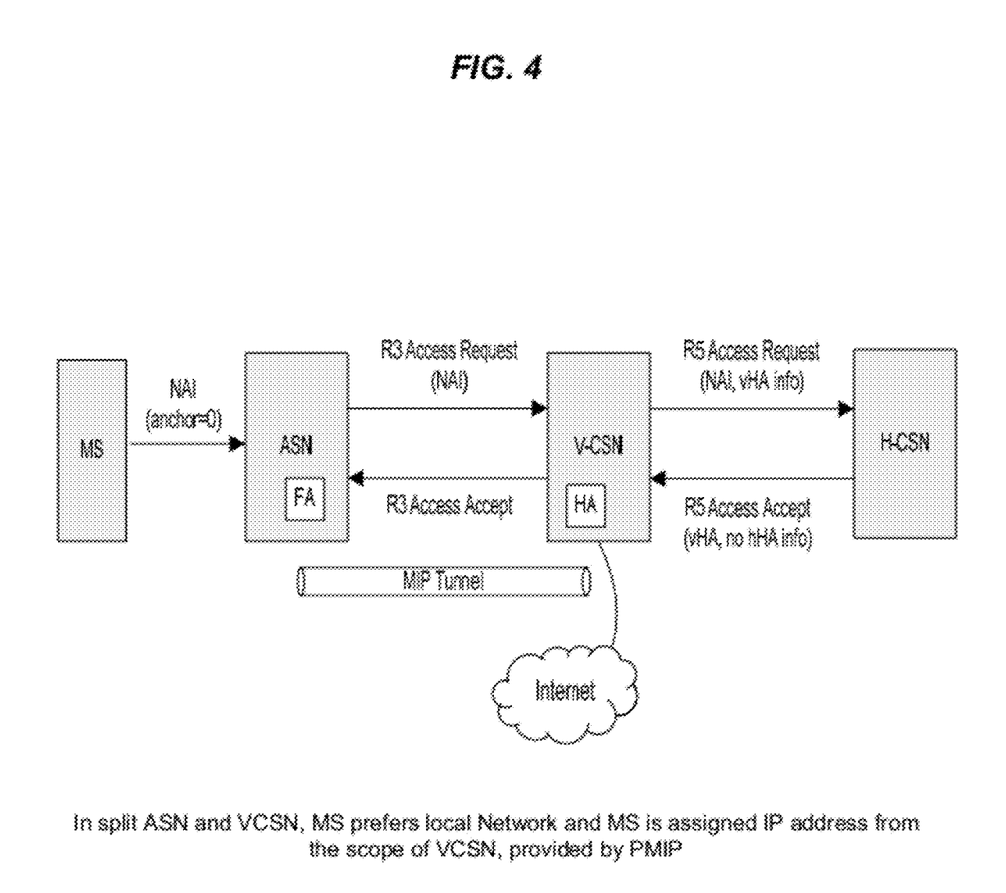
Figure 5:
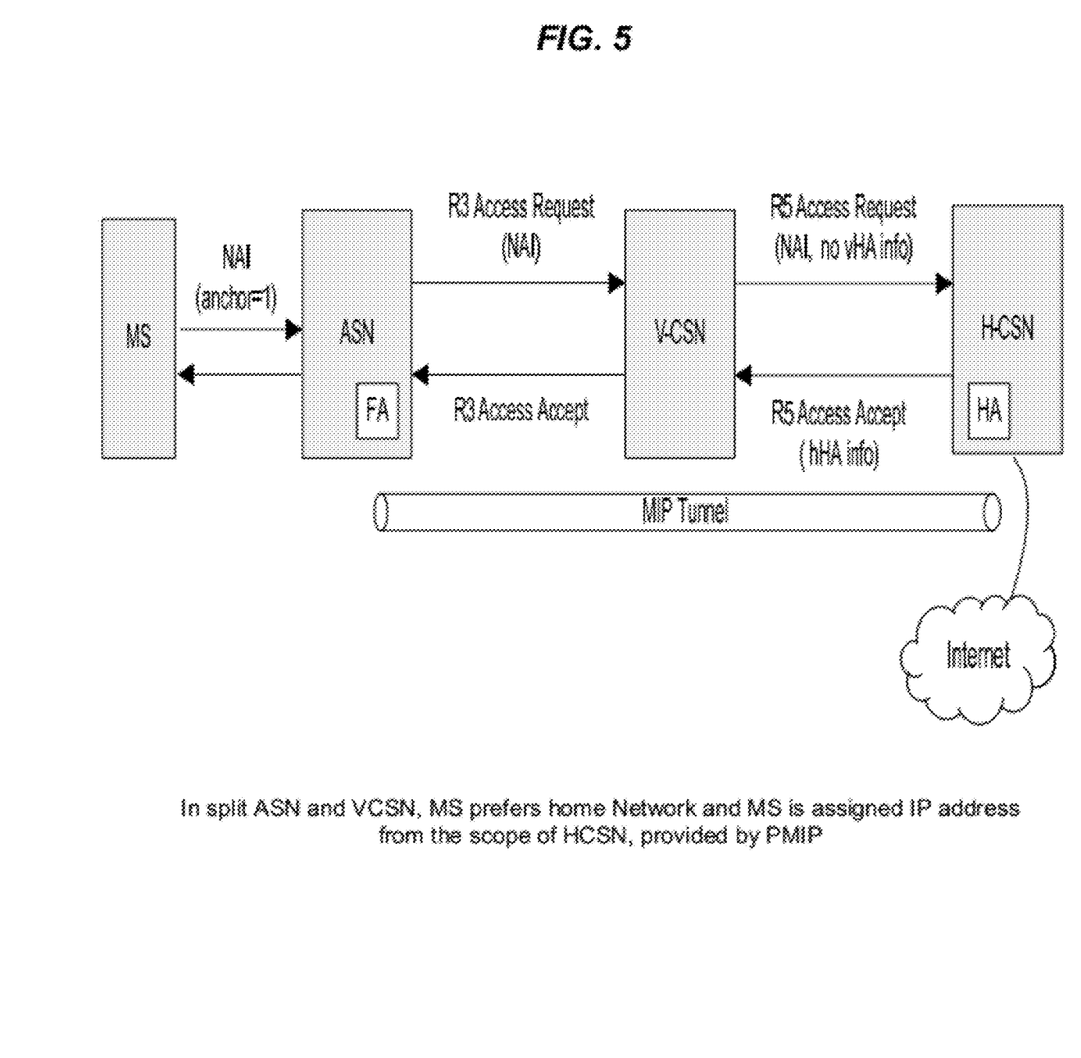

FIGS. 2-5 show examples of assigning an IP address to a mobile station in different network situations. FIG. 2 shows that, in a combined ASN and VCSN, the MS prefers local Network and MS is assigned IP address from the scope of the combined ASN and VCSN. FIG. 3 shows that, in combined ASN and VCSN, MS prefers Home Network and MS is assigned IP address from the scope of the HCSN, provided by PMIP. FIG. 4 shows that, In split ASN and VCSN, MS prefers local Network and MS is assigned IP address from the scope of VCSN, provided by PMIP. FIG. 5 shows that, in split ASN and VCSN, MS prefers home Network and MS is assigned IP address from the scope of HCSN, provided by PMIP.

Figure 6:
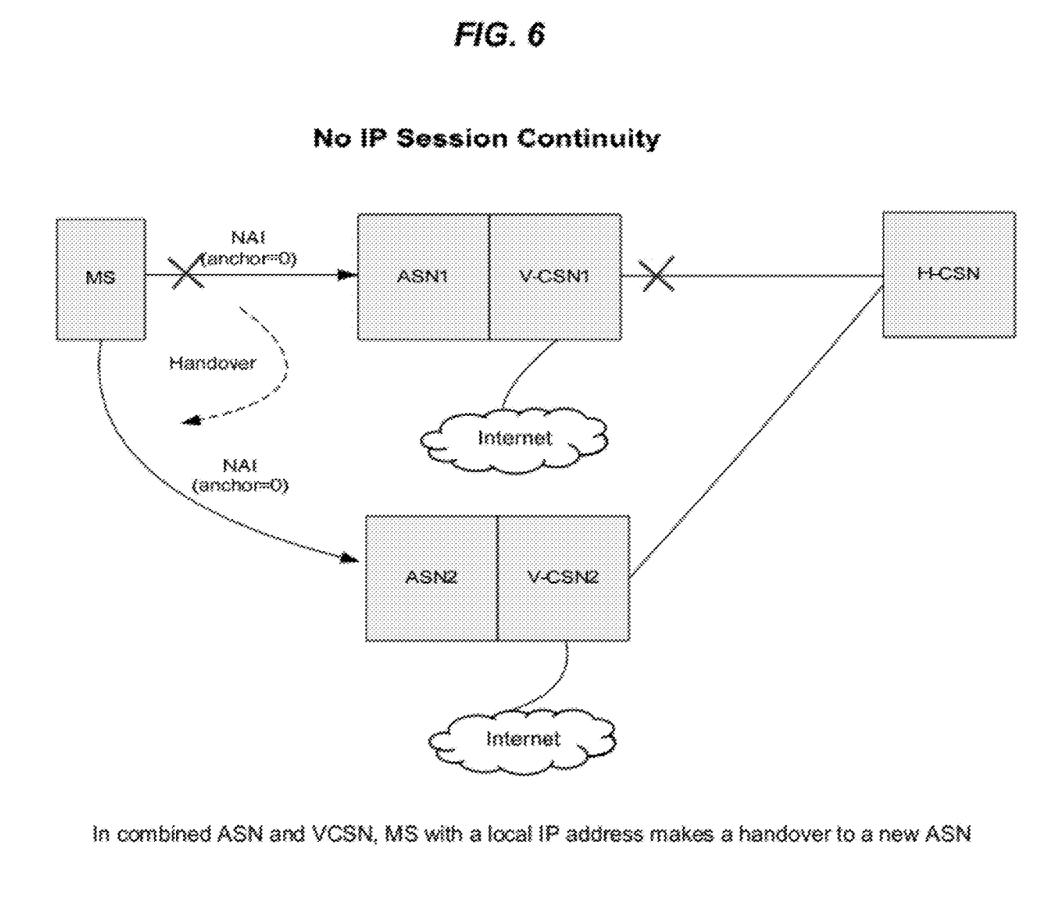
FIGS. 6 and 7 further show two examples of handover of a mobile station based on the present anchor point location preference indicator.
Figure 7:
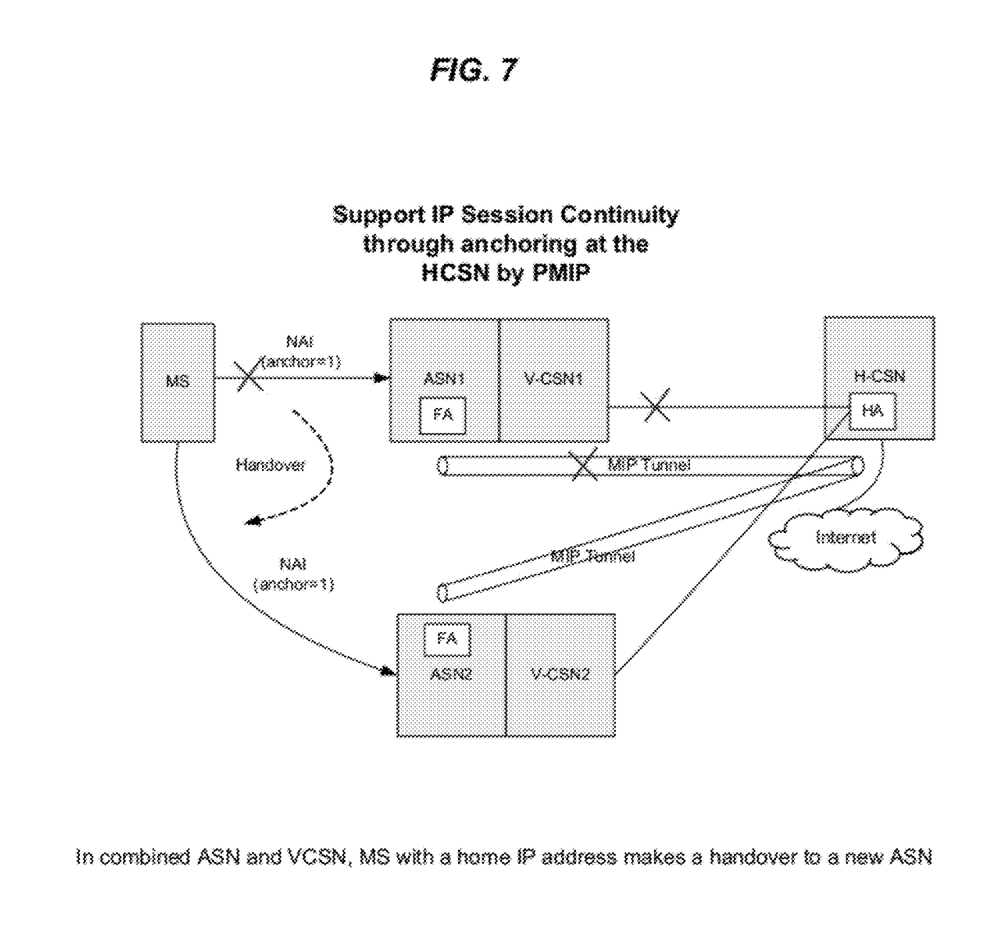

FIGS. 6 and 7 further show two examples of handover of a mobile station based on the present anchor point location preference indicator. FIG. 6 shows the handover of a MS with a local IP address from ASN1 to a new ASN2 in the combined ASN and VCSN. FIG. 7 shows another handover example where a MS with a home IP address makes a handover from ASN1 to a new ASN2.

Therefore, an anchor point location preference indicator is provided in the Network Access Identifier (NAI) during network entry process to indicates a preference for a mobile subscriber station for obtaining an IP address. The wireless network based on Proxy Mobil IP is operated to support the preference in the point location preference indicator in the NAI. Such an anchor point location preference indicator may be in the form of NAI decoration. Therefore, a roaming subscriber can choose to obtain its IP address anchored at the local network, instead of its remote home network, to provide better quality IP services. If the subscriber wants to maintain its session continuity with mobility, it may choose to anchor its IP address at home.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations are disclosed. Variations, modifications and enhancements to the described implementations, and other implementations may be made based on what is disclosed.

What is claimed is what is described and illustrated, including:

1. A method for wireless communication using network-based IP mobility, comprising:
    using an anchor point location preference indicator in a Network Access Identifier (NAI) used during network entry process in a wireless network to provide an indication of a preference for a mobile subscriber station to obtain an IP address; and
    operating the wireless network based on Proxy Mobil IP to support the preference in the anchor point location preference indicator in the Network Access Identifier (NAI).

2. The method as in claim 1, wherein:
the anchor point location preference indicator is in a form of NAI decoration.

3. The method as in claim 2, comprising:
using an absence of NAI decoration to indicate that the mobile subscriber prefers a local IP address.

4. The method as in claim 2, comprising:
using a first value of the NAI decoration to indicate preference of a local IP address; and
using a second value of the NAI decoration to indicate preference of an IP address anchored to a home network.

5. The method as in claim 2, comprising:
using a first value of the NAI decoration to indicate no preference on a source of an IP address; and
using a second value of the NAI decoration to indicate preference of an IP address anchored to a home network.

6. The method as in claim 1, wherein:
the wireless network is a WiMAX network.

7. The method as in claim 1, wherein:
the wireless network is different from a WiMAX network.

8. The method as in claim 7, wherein:
the wireless network is a 3GPP2 network.

9. A wireless communication network, comprising:
an access service network comprising base stations to provide radio access to wireless subscriber stations;
a connectivity service network in communication with the access service network to provide IP connectivity to said wireless subscriber stations;
a mechanism for providing an anchor point location preference indicator in a Network Access Identifier to represent a preference for a subscriber station to obtain an IP address between a local IP address and an IP address anchored to a home network of the subscriber station; and
a mechanism based on Proxy Mobil IP to support the preference in the anchor point location preference indicator in the Network Access Identifier.

10. The network as in claim 9, wherein:
a first value is assigned to the indicator to indicate preference of a local IP address; and
a second value is assigned to the indicator to indicate preference of an IP address anchored to the home network.

11. The network as in claim 9, wherein:
a first value is assigned to the indicator to indicate no preference on a source of an IP address; and
a second value is assigned to the indicator to indicate preference of an IP address anchored to the home network.

* * * * *